United States Patent [19]
Ohmori et al.

[11] Patent Number: 4,655,807
[45] Date of Patent: Apr. 7, 1987

[54] MATERIAL FOR GAS SEPARATING MEMBRANE

[75] Inventors: Akira Ohmori, Ibaraki; Nobuyuki Tomihashi, Takatsuki; Hiroshi Inukai, Settsu; Naoaki Izutani, Takatsuki, all of Japan

[73] Assignee: Daikin Kogyo Co., Ltd., Japan

[21] Appl. No.: 829,868

[22] Filed: Feb. 18, 1986

Related U.S. Application Data

[63] Continuation of Ser. No. 676,389, Nov. 29, 1984, abandoned.

[30] Foreign Application Priority Data

Nov. 29, 1983 [JP] Japan .................................. 58-226617

[51] Int. Cl.$^4$ ............................................. B01D 39/00
[52] U.S. Cl. ........................................ 55/522; 55/528; 526/245; 526/246
[58] Field of Search .................. 526/245, 246; 55/522, 55/528

[56] References Cited

U.S. PATENT DOCUMENTS

| | | | |
|---|---|---|---|
| 2,642,416 | 6/1953 | Ahlbrecht et al. | 526/245 |
| 3,544,537 | 12/1970 | Brace | 526/246 |
| 3,808,179 | 4/1974 | Gaylord | 526/245 |
| 3,919,183 | 11/1975 | Jäger et al. | 526/245 |
| 3,950,315 | 4/1976 | Cleaver | 526/245 |
| 4,100,340 | 7/1978 | Waldmann et al. | 526/245 |
| 4,529,783 | 7/1985 | Tsunoda et al. | 526/246 |
| 4,557,955 | 12/1985 | Walch et al. | 55/522 |
| 4,575,385 | 3/1986 | Brooks | 55/528 |

*Primary Examiner*—Paul R. Michl
*Attorney, Agent, or Firm*—Larson and Taylor

[57] ABSTRACT

This invention provides a material for gas separating membrane comprising a fluorine-containing acrylate or methacrylate polymer or a crosslinked compound of the polymer.

6 Claims, No Drawings

MATERIAL FOR GAS SEPARATING MEMBRANE

This application is a continuation of application Ser. No. 676,389 filed Nov. 29, 1984, now abandoned.

This invention relates to a material for a gas separating membrane.

It has been conventional practice to separate oxygen from air with a gas separating membrane useful in in combustion, therapy, fermentation, etc.

Heretofore known as such gas separating membranes are those prepared from polydimethylsiloxane, natural rubber, ethyl cellulose, polyethylene, butyl rubber or the like. However, these known membranes are low in one or both of the permeability coefficient for oxygen and the separation coefficient defined by the following equations and are therefore not fully satisfactory.

Permeability coefficient for oxygen $$K(O_2) = \frac{Q \cdot L}{S \cdot T \cdot \Delta P}$$

where $K(O_2)$ is the permeability coefficient for oxygen, Q is the amount of oxygen having permeated through the membrane, L is the thickness of the membrane, S is the area of the membrane, T is time, and $\Delta P$ is the difference in partial pressure of oxygen between the inlet side and the outlet side.

The permeability coefficient for nitrogen, $K(N_2)$, is defined in a similar manner.

Separation coefficient $$\alpha = \frac{K(O_2)}{K(N_2)}$$

where $\alpha$ is the separation coefficient, $K(O_2)$ is the permeability coefficient for oxygen and $K(N_2)$ is the permeability coefficient for nitrogen.

Unexamined Japanese Patent Publication No. 92449/1983 discloses a gas separating membrane prepared from a compound which is obtained by reacting ethyl cellulose or the like with perfluoroether group-containing compound of the formula $CF_3CF_2CF_2OCF(CF_3)COF$. This gas separating membrane was prepared in order to improve the performance of the conventional membrane by eliminating the above drawback that it is low in one or both of the permeability coefficient for oxygen and the separation coefficient. Nevertheless, the disclosed membrane is susceptible to hydrolysis in the presence of water and therefore has the serious drawback of readily permitting removal of the perfluoroether group, i.e. the problem of low chemical stability.

An object of the present invention is to provide a material for gas separating membrane which is great in both permeability coefficient for oxygen and separation coefficient.

Another object of the invention is to provide a material for chemically stable membrane for separating gases.

These objects and other features of the invention will become apparent from the following description.

The present invention provides a material for gas separating membrane comprising a fluorine-containing acrylate or methacrylate polymer or a crosslinked compound which may be optionally crosslinked.

The membrane for separating gases preapred from the material of the invention is great in both permeability coefficient for oxygen and separation coefficient and exhibits outstanding performance. It is chemically stable, is not liable to hydrolysis in the presence of water and is free of other problems.

According to the invention, the fluorine-containing acrylate or methacrylate polymer usually has a structural unit represented by the formula $$\begin{array}{c} R \\ | \\ -CH_2-C- \\ | \\ COO(CH_2)_l CF(OCF_2CF)_n OC_3F_7 \\ \phantom{COO(CH_2)_l}|\phantom{(OCF_2CF)_n}| \\ \phantom{COO(CH_2)_l}CF_3\phantom{(OCF_2CF)_n}CF_3 \end{array} \quad (a)$$

wherein R is $-H$ or $-CH_3$, l is an integer of from 1 to 3 and n is an integer of from 0 to 5, and/or a structural unit represented by the formula $$\begin{array}{c} R \\ | \\ -CH_2-C- \\ | \\ COOCH_2(CHX^1)_p(CH_2)_q(CF_2)_r X^2 \end{array} \quad (b)$$

wherein R is as defined above, $X^1$ is $-H$ or $-OH$, $X^2$ is $$-H, -F \text{ or } -CF\begin{matrix}\diagup CF_3 \\ \diagdown CF_3\end{matrix},$$

p and q are each 0 or 1, and r is an integer of from 1 to 10.

The polymer may optionally have a structural unit represented by the formula $$\begin{array}{c} R \\ | \\ -CH_2-C- \\ | \\ COOY \end{array} \quad (c)$$

wherein R is as defined above, and Y is $-H$ or a group represented by $-(CH_2)_sY^1$ (wherein $Y^1$ is $-COOH$, $-OH$, $$-CH\underset{\diagdown O \diagup}{\overset{}{\phantom{x}}}CH_2, \; -OC\!\!\overset{\displaystyle O}{\underset{\|}{\phantom{X}}}\!\!-\!\!\phantom{x}\!\!\underset{\diagdown\!\!=\!\!\diagup}{\overset{\diagup\!\!=\!\!\diagdown}{\phantom{X}}}\!\!-N_3 \text{ or}$$

$$-O\overset{\displaystyle O}{\underset{\|}{C}}-CH=CH-\!\!\underset{\diagdown\!\!=\!\!\diagup}{\overset{\diagup\!\!=\!\!\diagdown}{\phantom{X}}},$$

and s is an integer of from 1 to 5), in addition to the structural unit represented by the formula (a) and/or the structural unit represented by the formula (b).

The fluorine-containing acrylate or methacrylate polymer can be obtained usually by homopolymerizing a monomer of fluorine-containing acrylate or methacrylate represented by the formula

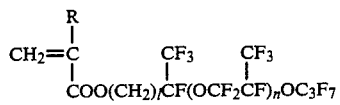

(d)

wherein R, l and n are as defined above, or by the formula

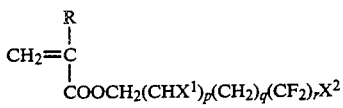

(e)

wherein R, $X^1$, $X^2$, p, q and r are as defined above. Alternatively, the polymer can be prepared by copolymerizing the monomer of the formula (d) and the monomer of the formula (e). It is also possible to prepare the polymer by copolymerizing the monomer of the formula (d) and/or the monomer of the formula (e) with a functional group-containing monomer represented by the formula

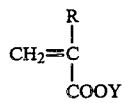

(f)

wherein R and Y are as defined above.

Besides such monomers, other ethylenically unsaturated compound can be incorporated into the fluorine-containing acrylate or methacrylate polymer as a copolymerized component insofar as the properties, especially the permeability coefficient for oxygen and the separation coefficient, of the polymer are not impaired. Examples of useful ethylenically unsaturated compounds are methyl methacrylate, methyl acrylate, ethylene, trimethyl vinyl silane, vinyl acetate and the like.

When the fluorine-containing acrylate or methacrylate polymer of the present invention is to be prepared by copolymerizing the monomer of the formula (d) and/or the monomer of the formula (e) with the monomer of the formula (f) or with the ethylenically unsaturated compound, it is desirable to copolymerize at least about 70% by weight of the monomer (d) and/or the monomer (e) based on all the monomers so that the gas separating membrane to be formed will have a high permeability coefficient for oxygen without impairment. It is more desirable to copolymerize about 80 to about 98% by weight of the monomer (d) and/or the monomer (e) with about 20 to about 2% by weight of the monomer (f).

The polymer is obtained, for example, by solution, suspension, emulsion or bulk polymerization. Generally solution polymerization is resorted to because the polymer then obtained need not be dissolved in a solvent again for the preparation of a gas separating membrane.

Examples of solvents which are usually used for solution or suspension polymerization are those containing fluorine, such as m-xylene hexafluoride, 1,1,2-trichloro-1,2,2-trifluoroethane, 1,2,4,4-tetrachloro-1,1,2,3,3,4-hexafluorobutane, and the like. These fluorine-containing solvents are usable as mixed with a hydrocarbon solvent such as acetone, methyl ethyl ketone, methyl isobutyl ketone, butyl acetate, ethyl acetate and the like.

Examples of initiators useful for solution, suspension or bulk polymerization are organic peroxides such as benzoyl peroxide, dicumyl peroxide, tertiary butyl peroxyisobutyrate and diisopropyl peroxydicarbonate, and azo compounds such as azobisisobutyronitrile and azobisisovaleronitrile. Examples of useful initiators for emulsion polymerization are oxidizing agents such as ammonium persulfate, potassium persulfate, and redox initiators comprising such an oxidizing agent, sodium sulfite or like reducing agent and iron (III) sulfate or like salt of transition metal. The polymerization initiator is used usually in an amount of 0.1 to 5% by weight based on all the monomers.

Examples of useful emulsifiers for emulsion polymerization are sodium lauryl sulfate, perfluorooctanoic acid, polyethyleneoxide lauryl ether and the like. These emulsifiers are used in an amount of about 0.01 to about 5% by weight based on the water used.

The polymerization temperature is about 0° to about 150° C. for any case of polymerization.

The fluorine-containing acrylate or methacrylate polymer thus obtained according to the invention usually has a molecular weight ranging from about 10,000 to about 5,000,000, preferably about 500,000 to about 2,000,000, as measured by gel permeation chromatography using polystyrene as the standard.

The gas separating membrane of this invention is prepared by the following process.

The fluorine-containing acrylate or methacrylate polymer prepared by one of the foregoing polymerization processes is dissolved in one of the solvent exemplified above with respect to the solution polymerization to obtain a polymer solution. When prepared by solution polymerization, the polymer is already in the form of a solution, which is used as it is, or is suitably concentrated or diluted before use.

With or without addition of a crosslinking agent, the polymer solution is then applied to a smooth-surfaced plate of glass, metal or the like or to a porous substrate of polytetrafluoroethylene or the like by a conventional film forming method, for example, by bar coater, spin coater, dipping or Langmuir method to form a membrane which is generally about 1 to about 50 μm in thickness. When formed on the smooth-surfaced plate of glass, metal or the like, the polymer membrane is subjected to a crosslinking treatment when so required, peeled off the plate and used as a gas separating membrane as fixed to a suitable substrate. Alternatively when formed on the porous substrate, the polymer membrane is treated for crosslinking when so required, and used as a gas separating membrane as adhered to the substrate.

The crosslinking agent can be used to crosslink the polymer and give enhanced strength to the gas separating membrane to be formed when so required. The crosslinking agent can be used when the fluorine-containing acrylate or methacrylate polymer contains one or more functional groups such as carboxyl, hydroxyl or epoxy, for example when a monomer of the formula (e) wherein $X^1$ is —OH, or a monomer of the formula (f) is used as a constituent monomer. Examples of crosslinking agents which are generally useful when the functional group is carboxyl are compounds having at least two amino groups such as ethylenediamine, hexamethylenediamine, triethylenetetramine and diaminodiphenylmethane; compounds having at least two epoxy groups such as butylene diglycidyl ether and bisphenol A diglycidyl ether; compounds having at least two isocyanate groups such as hexamethylene diisocyanate trimer and tolylene diisocyanate, etc. Examples of crosslinking agents which are useful when the functional group is hydroxyl are compounds having at least two isocyanate groups and exemplified above, and compounds having at least two acid halides such as hexamethylene dicarbonyl chloride, adipoyl chloride, terephthaloyl chloride and the like. Examples of crosslinking agents which are usable when the functional group is epoxy are compounds having at least two amino groups and exemplified above, prepolymers of amino resins, methylolated melamine, etc. Also usable are Lewis acids, especially $BF_3$, or compounds capable of producing $BF_3$, such as

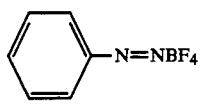

which produces $BF_3$ when subjected to the action of HCl or irradiated with light and $BF_3C_2H_5NH_2$ complex which forms $BF_3$ when heated; acid anhydrides such as phthalic anhydride, maleic anhydride and the like.

The amount of the crosslinking agent to be used is not always definite but is appropriately determined depending on the kind and amount of functional groups contained in the polymer, kind of the crosslinking agent, etc. This judgment is well within the skill of the polymer art. To fulfill the objects of the invention, the crosslinking agent is usually used in an amount effective for consuming all the functional groups of the polymer, i.e., the equivalent amount based on the functional groups. However, lesser amount of the crosslinking agent may also give satisfactory results. Generally, when the amount is about 70 to about 150% by weight of the entire amount of the monomer (f), the resulting polymer can be crosslinked satisfactorily, giving improved strength to the gas separating membrane to be obtained.

When the polymer contains azido group or cinnamoyl group as a functional group, the polymer is crosslinked usually by irradiation with ultraviolet rays, far ultraviolet rays or sunlight instead of using any crosslinking agent.

For crosslinking, the polymer membrane formed on the aforementioned plate or substrate is allowed to stand at a temperature between room temperature and about 200° C. for about 30 minutes to about 7 days.

The monomers of the formulae (d), (e) and (f) are known compounds and can be prepared by known processes.

Given below are Preparation Examples and Test Examples of gas separating membranes according to the invention along with Comparison Examples. Each of the fluorine-containing acrylate or methacrylate polymers prepared in Preparation Examples had a molecular weight of about 500,000 to about 2,000,000 as determined by gel permeation method using polystyrene as the standard.

PREPARATION EXAMPLES 1–5

A 100 g quantity of each monomer of fluorine-containing acrylate or methacrylate listed in Table 1, 200 g of m-xylene hexafluoride and 1 g of azobisisobutyronitrile were placed into a glass autoclave and cooled with dry ice-methanol, followed by degassification. The autoclave was thereafter maintained at 60° C. to polymerize the monomer with stirring for 24 hours.

To the polymer solution obtained was added 200 g of m-xylene hexafluoride, and the mixture was thoroughly stirred. With use of a spin coater rotating at 2,000 r.p.m., a 10 ml portion of the resulting solution was applied to a porous substrate obtained by stretching a polytetrafluoroethylene sheet, 60% in porosity, 0.1 to 1 $\mu$m in the minor diameter of pores and 1 to 10 $\mu$m in major diameter of pores. The coated substrate was then cut to a diameter of 150 mm to obtain a specimen of gas separating membrane.

PREPARATION EXAMPLE 6

The same polymerization procedure as in Preparation Examples 1–5 was repeated except that the monomer of fluorine-containing methacrylate and functional group-containing monomer listed in Table 1 were used in a combined amount of 100 g.

The resulting polymer solution was diluted to 20% by weight in the same manner as in Preparation Examples 1–5. Hexamethylene diisocyanate trimer was added to the diluted polymer solution in a ratio of 1.5 parts by weight per 100 parts by weight of the solution, and a membrane was prepared in the same manner as in Preparation Examples 1–5. The membrane was thereafter allowed to stand at room temperature for 7 days to crosslink the polymer.

PREPARATION EXAMPLE 7

The same polymerization and membrane-forming procedures as in Preparation Example 6 were repeated with the exception of using the monomers listed in Table 1 and using 0.8 part by weight of hexamethylenediamine in place of 1.5 parts by weight of hexamethylene diisocyanate trimer. The polymer was crosslinked at room temperature for 3 days.

PREPARATION EXAMPLE 8

The same polymerization procedure as in Preparation Examples 1–5 was repeated except that the monomer of fluorine-containing methacrylate and functional group containing monomer listed in Table 1 were used in a combined amount of 100 g.

The resulting polymer solution was diluted and made into a membrane in the same manner as in Preparation Examples 1–5. The crosslinking reaction was conducted in $BF_3$ gas at 25° C. for 3 hours.

PREPARATION EXAMPLE 9

The same polymerization procedure as in Preparation Examples 1–5 was repeated except that the monomer of fluorine-containing methacrylate and functional group-containing monomer listed in Table 1 were used in a combined amount of 100 g.

The resulting polymer solution was diluted and made into a membrane in a dark room in the same manner as in Preparation Examples 1–5. The crosslinking reaction was conducted by exposing the coating to sunlight at 25° C. for 3 days.

PREPARATION EXAMPLE 10

A thin polymer coating was formed on a glass plate in the same manner as in Preparation Example 1 with use of the same diluted solution as used in Preparation Example 1. The glass plate was placed into water after drying the coating, and the polymer coating was removed to obtain a specimen of gas separating membrane.

PREPARATION EXAMPLES 11 AND 12

In the same manner as in Preparation Example 6, the monomer of fluorine-containing acrylate and functional group-containing monomer listed in Table 1 were copolymerized in a combined amount of 100 g, and the copolymer was made into a membrane and crosslinked.

PREPARATION EXAMPLES 13 AND 14

The monomer listed in Table 1 was polymerized in the same manner as in Preparation Examples 1-5, and the polymer was made into a membrane and crosslinked in the same manner as in Preparation Example 6.

TEST EXAMPLES 1-14

The membrane specimens prepared as above were tested for permeability coefficients for nitrogen and oxygen and separation coefficient under the following conditions according to ASTM D 1434 (V method).

Gas used: standard mixture of 79 vol.% of nitrogen and 21 vol.% of oxygen

Test pressure: inlet pressure 5 kg/cm$^2$ (absolute outlet pressure 1 kg/cm$^2$ (absolute)

Amount of permeation of gas: 4 cc

Testing time: time taken for the permeation of gas (sec.) through the membrane specimen Area of membrane: 135 cm$^2$ Thickness of membrane: Value obtained by measuring the weight of the polymer on the substrate and dividing the weight by the area of the polymer fixed to the substrate and the specific gravity of the polymer The composition of the gas which had permeated through the membrane was analyzed by gas chromatography. The "permeability coefficient" given in Table 1 is the permeability coefficient for oxygen and the unit thereof is cc·cm/(cmHg·sec·cm$^2$).

COMPARISON EXAMPLE 1

The same polymerization, membrane-forming and crosslinking procedures as in Preparation Example 6 were repeated except that the copolymerization ratio of the monomers was changed to the value listed in Table 1. The membrane was then tested in the same manner as above.

Table 1 also shows the test results obtained.

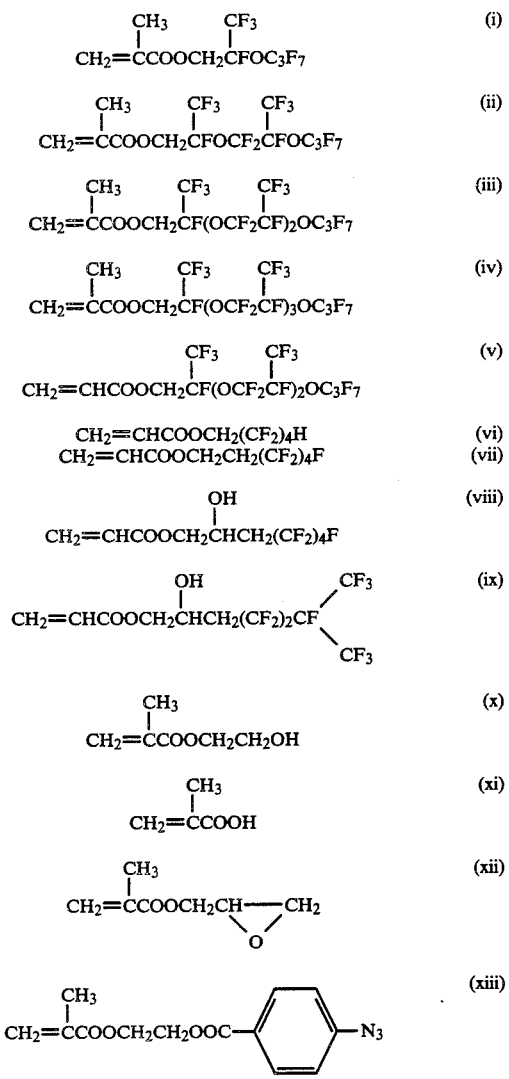

PREPARATION EXAMPLE 15

TABLE 1

| Preparation Example | Monomer of fluorine-containing acrylate or methacrylate | Functional group-containing monomer | Copolymerization ratio (by wt.) | Thickness of membrane (μm) | Permeability coefficient (×10$^{-10}$) | Separation coefficient |
|---|---|---|---|---|---|---|
| 1 | i | None | 100/0 | 4.8 | 48 | 3.0 |
| 2 | ii | None | 100/0 | 4.6 | 37 | 3.6 |
| 3 | iii | None | 100/0 | 4.8 | 45 | 3.5 |
| 4 | iv | None | 100/0 | 5.1 | 80 | 4.1 |
| 5 | v | None | 100/0 | 4.1 | 65 | 3.8 |
| 6 | iii | x | 90/10 | 5.3 | 35 | 3.6 |
| 7 | iii | xi | 90/10 | 5.1 | 40 | 3.5 |
| 8 | iii | xii | 90/10 | 5.0 | 46 | 3.5 |
| 9 | iii | xiii | 98/2 | 4.7 | 20 | 5.4 |
| 10 | ii | None | 100/0 | 4.7 | 59 | 3.6 |
| 11 | vi | x | 90/10 | 5.1 | 28 | 3.8 |
| 12 | vii | x | 90/10 | 4.3 | 34 | 3.3 |
| 13 | viii | None | 100/0 | 4.6 | 41 | 3.7 |
| 14 | ix | None | 100/0 | 5.3 | 43 | 3.6 |
| Comp. Ex. 1 | iii | x | 50/50 | 4.9 | 0.6 | 3.6 |

The symbols i to xiii in Table 1 stand for the following monomers.

A gas separating membrane was prepared in the same manner as in Example 9 except that 75 g of the monomer of the formula (i), 20 g of the monomer of the formula (ix) and 5 g of the monomer of the formula (xiii) were used. The resulting membrane had a thickness of 6.2 μm. The membrane was tested in the same manner as in Test Examples 1-14. The permeability coefficient for oxygen thereof was $32 \times 10^{-10}$ cc·cm/(cmHg·sec·cm$^2$) and the separation coefficient thereof was 3.4.

COMPARISON EXAMPLE 2

Table 2 shows the permeability coefficients for oxygen and separation coefficients of conventional gas separating membranes, as determined in the same manner as in Test Examples 1-14.

TABLE 2

| Material of membrane | Permeability coefficient | Separation coefficient |
| --- | --- | --- |
| Polydimethylsiloxane | 352 | 1.94 |
| Natural rubber | 23 | 2.46 |
| Ethylcellulose | 15 | 3.31 |
| Polyethylene | 2.9 | 2.98 |
| Butyl rubber | 1.3 | 4.00 |

In Table 2, the unit of "permeability coefficient" is $10^{-10}$ cc·cm/(cmHg·sec·cm$^2$).

COMPARISON EXAMPLE 3

(A) Forty-five grams of ethyl cellulose (ethoxylation ratio: 49%) was dissolved in 400 ml of dry methylene chloride at room temperature. To the solution were added 56 g of dry pyridine, and then 97 g of a compound of the formula CF$_3$CF$_2$CF$_2$OCF(CF$_3$)COF with stirring. The stirring was continued for 5 hours. The resulting mixture was poured into a mixture of methanol and water (70:30) to precipitate a solid. The solid thus formed was separated, and dissolved in 1 liter of acetone. Then the resulting solution was poured into a mixture of methanol and water (70:30) for reprecipitation. The precipitate thus formed was filtered, air-dried and further dried under reduced pressure at 90° C.

(B) The dry solid was dissolved in acetone to prepare a solution of 10% by weight. The solution was applied to a porous substrate of polytetrafluoroethylene. The coating was heated at 50° C. for 18 hours, giving a membrane having a thickness of 19 μm.

(C) The membrane thus obtained was immersed in a 1 wt.% aqueous solution of sodium carbonate for 1 week. Thereafter infrared absorption spectrum was measured. It was revealed that the absorbance of OH groups had increased by three times, indicating the elimination of the fluorine-containing groups.

(D) The same procedure as in (C) above was repeated except that the membrane of the invention prepared in Preparation Example 6 or 14 was used. The infrared absorption spectra did not show any increase in the absorbance of the OH groups, even after the membranes were immersed in a 1 wt.% aqueous solution of sodium carbonate for 1 week, indicating that the membranes obtained in Preparation Examples 6 and 14 were resistant to hydrolysis.

We claim:
1. In a method of separating oxygen from air with a gas separating membrane, the improvement wherein the gas separating membrane is one which has high permeability coefficient for oxygen and high separation coefficient, and which is prepared from a fluorine-containing acrylate or methacrylate polymer comprising:

(i) 70 to 100% by weight of a structural unit represented by the formula

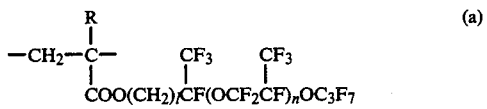

wherein R is —H or —CH$_3$, l is an interger of from 1 to 3 and n is 0 or an interger of from 1 to 5, and/or a structural unit represented by the formula

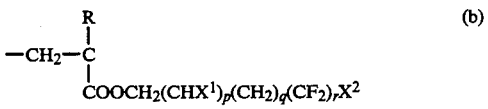

wherein R is as defined above, X$^1$ is —H or —OH, X$^2$ is —H, —F or —CF(CF$_3$)$_2$, p and q are each 0 or 1, and r is an interger of from 1 to 10, and (ii) 0 to 30% by weight of a structural unit represented by the formula

wherein R is as defined above, and Y is —H or a group represented by —(CH$_2$)$_s$Y$^1$ (wherein Y$^1$ is —COOH, —OH,

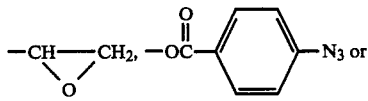

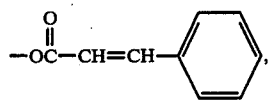

and s is an interger of from 1 to 5).

2. A method as defined in claim 1 wherein the polymer is a copolymer comprising about 80 to about 98% by weight of the structural unit of the formula (a) and/or the structural unit of the formula (b) and about 20 to about 2% by weight of the structural unit of the formula (c).

3. A method as defined in claim 1 wherein the polymer consists essentially of the structural unit of the formula (a) and/or the structural unit of the formula (b).

4. A method as defined in claim 1 wherein the polymer contains one or more functional groups derived from the structural unit of the formula (c) and/or the structural unit of the formula (b) wherein X$^1$ is —OH and p is 1, and selected from the group consisting of hydroxyl, carboxyl and epoxy, the functional groups having been aleady crosslinked by a crosslinking agent capable of crosslinking the functional groups, and the crosslinking agent being a compound having at least two amino, epoxy or isocyanate groups when the functional group is carboxyl; or being a compound having at least two isocyanate or acid halide groups when the functional group is hydroxyl; or being a compound having at least two amino groups, prepolymers of amino resins, methylolated melamine, BF$_3$, a compound capable of producing BF$_3$ or an acid anhydride when the functional group is epoxy.

5. A method as defined in claim 1 the crosslinking agent is ethylenediamine, hexamethylenediamine, triethylenetetramine, triethylenetetramine, or diaminodiphenylmethane, butylenediglycidyl ether, bisphenol A diglycidyl ether, hexamethylene diisocyanate trimer or tolylene diisocyanate when the functional group is carboxyl; or hexamethylene diisocyanate trimer, tolylene diisocyanate, hexamethylene dicarbonyl chloride, adipoyl chloride, terephthaloyl chloride when the functional group is hydroxyl; or ethylenediamine, hexamethylenediamine, triethylenetetramine, triethylenetetramine, diaminodiphenylmethane, prepolymers of amino resins, methylolated melamine, BF$_3$, C$_6$H$_5$—N=NBF$_4$, BF$_3$C$_2$H$_5$NH$_2$, phthalic anhydride or maleic anhydride when the functional group is epoxy.

6. A method as defined in claim 1 wherein the polymer contains one or more functional groups derived from the structural unit of the formula (c) and selected from the group consisting of azidobenzoyloxy and cinnamoyloxy, the functional groups having been already crosslinked by irradiation with ultraviolet rays, far ultraviolet rays or sunlight.

* * * * *